(12) United States Patent
Miller (10) Patent No.: US 6,663,127 B2
(45) Date of Patent: Dec. 16, 2003

(54) SELF-PROPELLED EXERCISE DEVICE

(76) Inventor: Larry Miller, 4030 Oak Tree Cir., Rochester, MI (US) 48306

( * ) Notice: Subject to any disclaimer, the term of this patent is extended or adjusted under 35 U.S.C. 154(b) by 0 days.

(21) Appl. No.: 10/241,393

(22) Filed: Sep. 11, 2002

(65) Prior Publication Data

US 2003/0047902 A1 Mar. 13, 2003

Related U.S. Application Data

(60) Provisional application No. 60/318,785, filed on Sep. 12, 2001.

(51) Int. Cl.[7] ................................................. B62M 1/04
(52) U.S. Cl. ....................... 280/256; 280/252; 280/253
(58) Field of Search .................................. 280/220, 221, 280/252, 253, 256; 482/57

(56) References Cited

U.S. PATENT DOCUMENTS

| | | | |
|---|---|---|---|
| 514,198 A | * 2/1894 | Moehn et al. | 280/223 |
| 540,686 A | * 6/1895 | Price | 280/236 |
| 594,980 A | * 12/1897 | Booth et al. | 280/253 |
| 608,674 A | * 8/1898 | Harshner | 280/257 |
| 1,273,906 A | 7/1918 | Nickey | |
| 1,323,004 A | 11/1919 | Boyd | |
| 1,505,271 A | * 8/1924 | Mc Neil | 280/253 |

(List continued on next page.)

FOREIGN PATENT DOCUMENTS

| | | | |
|---|---|---|---|
| EP | 0 543 527 A1 | 5/1993 | |
| GB | 2085379 A | * 4/1982 | B62M/1/04 |

*Primary Examiner*—Lesley D. Morris
*Assistant Examiner*—Paul Royal, Jr.
(74) *Attorney, Agent, or Firm*—Gifford, Krass, Groh, Sprinkle, Anderson & Citkowski, P.C.

(57) ABSTRACT

A self-propelled exercise device such as a bicycle includes a frame having a drive wheel rotatably supported thereupon. The bicycle includes a first and a second foot link which are powered by the user. A coupler assembly directs the first end of each foot link in an arcuate path of travel, and a foot link guide directs the second end of each foot link in a reciprocating path of travel. A power transfer linkage is in mechanical communication with the coupler assembly and with the drive wheel. When the device is in use, a user's foot disposed upon the foot link travels in an elliptical path of travel and provides power to the foot link. This power is transferred to the drive wheel by the power transfer linkage so as to propel the bicycle.

15 Claims, 8 Drawing Sheets

U.S. PATENT DOCUMENTS

| | | | | |
|---|---|---|---|---|
| 1,557,634 A | | 10/1925 | Walter | |
| 1,617,357 A | | 2/1927 | Walter | |
| 2,185,698 A | * | 1/1940 | Wright | 280/251 |
| 2,424,639 A | * | 7/1947 | Sobirai | 280/257 |
| 3,865,366 A | | 2/1975 | Stantial | 272/73 |
| 3,877,724 A | * | 4/1975 | Chase | 280/241 |
| 3,899,932 A | | 8/1975 | Durham | 74/243 NC |
| 4,026,571 A | * | 5/1977 | Vereyken | 280/251 |
| 4,077,648 A | * | 3/1978 | Seul | 280/236 |
| 4,193,324 A | | 3/1980 | Marc | 74/750 B |
| 4,456,276 A | * | 6/1984 | Bortolin | 280/257 |
| 4,577,879 A | * | 3/1986 | Vereyken | 280/256 |
| 4,666,173 A | * | 5/1987 | Graham | 280/255 |
| 4,865,577 A | | 9/1989 | Freudenstein | 474/141 |
| 4,869,494 A | | 9/1989 | Lambert, Sr. | 272/73 |
| 5,110,148 A | | 5/1992 | Stienbarger et al. | 280/221 |
| 5,261,294 A | | 11/1993 | Ticer et al. | 74/594.1 |
| 5,419,572 A | | 5/1995 | Stiller et al. | 280/252 |
| 5,433,680 A | | 7/1995 | Knudsen | 482/57 |
| 5,496,238 A | | 3/1996 | Taylor | 482/63 |
| 5,527,246 A | * | 6/1996 | Rodgers, Jr. | 482/57 |
| 5,549,480 A | | 8/1996 | Cheng | 439/79 |
| 5,549,529 A | | 8/1996 | Rasmussen | 482/96 |
| 5,591,107 A | * | 1/1997 | Rodgers, Jr. | 482/57 |
| 5,611,757 A | * | 3/1997 | Rodgers, Jr. | 482/57 |
| 5,690,346 A | * | 11/1997 | Keskitalo | 280/234 |
| 5,836,855 A | | 11/1998 | Eschenbach | 482/57 |
| 5,899,477 A | | 5/1999 | Vergara | 280/261 |
| 5,944,638 A | | 8/1999 | Maresh et al. | 482/63 |
| 6,017,295 A | * | 1/2000 | Eschenbach | 482/57 |
| 6,024,676 A | * | 2/2000 | Eschenbach | 482/51 |
| 6,045,487 A | * | 4/2000 | Miller | 482/52 |
| 6,090,013 A | * | 7/2000 | Eschenbach | 482/52 |
| 6,171,217 B1 | | 1/2001 | Cutler | 482/57 |
| 6,277,054 B1 | * | 8/2001 | Kuo | 482/51 |
| 6,277,056 B1 | | 8/2001 | McBride et al. | 482/57 |
| 6,398,695 B2 | * | 6/2002 | Miller | 482/52 |
| 6,422,976 B1 | * | 7/2002 | Eschenbach | 482/52 |
| 6,440,042 B2 | * | 8/2002 | Eschenbach | 482/52 |

* cited by examiner

SELF-PROPELLED EXERCISE DEVICE

RELATED APPLICATION

This application claims priority of U.S. Provisional Patent Application Ser. No. 60/318,785 filed Sep. 12, 2001, and entitled "Self-Propelled Exercise Device."

FIELD OF THE INVENTION

This invention relates generally to exercise equipment. Specifically, the invention relates to an exercise device which is propelled by the user. More specifically, the invention relates to a foot powered exercise device such as a bicycle or the like. Most specifically, the invention relates to a self-propelled exercise device in which the user's foot travels in a generally elliptical path.

BACKGROUND OF THE INVENTION

Elliptical exercise devices provide a low-impact, aerobic form of exercise in which a user's feet move along a generally elliptical path of travel which simulates a natural running and stepping motion. The action of such devices is superior to that achieved by stair steppers, stationary bicycles or ski machines. In general, such elliptical exercise devices have heretofore been configured as stationary devices. In many instances, users prefer to engage in a mobile form of exercise such as running, bicycling, and the like. Heretofore available, foot powered, mobile exercise equipment has not been able to provide a suitable, elliptical path of foot travel. Within the context of the present disclosure it is to be understood that an "elliptical" path of foot travel comprises a generally elongated, closed, curved path of travel which encompasses mathematically perfect ellipses, as well as more irregular shapes such as ovals, flattened ellipses and the like. In one specific elliptical path of travel, as achieved by specific embodiments of the present invention, a user's foot travels along a path such that when moving forward, the heel portion of a user's foot initially rises at a faster rate than the toe portion, and when the user's foot is moving rearward, the heel portion initially falls at a faster rate than does the toe portion. All of such elliptical paths of travel have been found to provide a comfortable and natural action which is conducive to continued and productive exercise.

As will be explained hereinbelow, the present invention provides a user powered exercise device, such as a bicycle, which operates to provide an elliptical path of foot travel. Furthermore, the mechanical configuration of the present invention may be readily adapted to variously configured production models of bicycles; therefore, the present invention may be readily manufactured with minimal tooling commitments. These and other advantages of the present invention will be readily apparent from the drawings, discussion and description which follow.

BRIEF DESCRIPTIONS OF THE INVENTION

There is disclosed herein a self-propelled exercise device which comprises a frame having a drive wheel rotatably supported thereupon, and a first pivot axis defined upon the frame. The device includes a first and second foot link, each of which has a foot receiving portion defined thereupon, and a coupler assembly which is in mechanical communication with a first pivot axis and with a first end of each of said first and second foot links. The coupler assembly is operative to direct the first ends of the foot links in an arcuate path of travel. The apparatus also includes a foot link guide which is supported by the frame. The foot link guide is operable to engage a second end of each of the foot links and to direct the second ends along a reciprocating path of travel. The apparatus further includes a power transfer linkage which is in mechanical communication with the coupler assembly and with the drive wheel. When the second end of one of the foot links travels in a reciprocal path, and the first end of that foot link travels in an arcuate path, a user's foot supported thereupon travels in a generally elliptical path of travel and the power transfer linkage transfers power from said coupler assembly to the drive wheel so as to supply propulsive power thereto.

In specific embodiments, the foot link guide may comprise one or more tracks which engage second ends of the foot links, or the guide may comprise a pair of swing arms pivotally supported on the frame so that each arm engages a second end of a respective foot link and directs it in the reciprocating path of travel. The coupler assembly may comprise a pair of crank arms which are pivotally supported at the first pivot axis.

In another embodiment, the coupler assembly may include a first and a second drive link, and a first and second coupling member, each of which is in mechanical communication with the first end of a respective one of the drive links and with the first pivot axis. In this embodiment, each coupling member is operative to direct the first end of its respective drive link in an arcuate path of travel. In this embodiment, there is also included a drive link guide which is operable to engage a second end of a respective one of the drive links and to direct that second end along a reciprocal path of travel. In this embodiment, the first end of each foot link is coupled to a respective one of the first and second drive links so that the drive links will direct those first ends in the arcuate path of travel. In some embodiments, the device of the present invention is configured as a bicycle, and in that regard may include additional features such as a seat, handlebars, and a geared transmission.

Also disclosed is a bicycle frame which is specifically configured for use in the present invention. The frame includes an integral track for guiding the foot links in a reciprocal path.

DETAILED DESCRIPTION OF THE INVENTION

In accord with the present invention, a self-propelled exercise device configured as a bicycle or the like includes a frame having one or more wheels rotatably supported thereupon. The device further includes a first and second foot link, each of which has a foot receiving portion, such as a foot pad, defined thereupon. The exercise device includes a coupler assembly which engages a first end of each of the foot links, and operates to direct the first ends of the foot links in an arcuate path of travel. Within the context of this disclosure, an arcuate path of travel is a closed, curved path of travel; and as such includes circular paths of travel as well as oval paths, elliptical paths, teardrop shaped paths, as well as irregular paths, which may include variously curved and straight segments. The device also includes a foot link guide which is supported by the frame, and the guide operates to engage a second end of each of the foot links and to direct these second ends along a reciprocating path of travel. As is understood within the context of this disclosure, a reciprocating path of travel comprises a repetitive back and forth path, in which the forward and return paths are essentially overlapping. The reciprocal path of travel may be straight or curved. The device also includes a power transfer, or drive, linkage which is in mechanical communication with the coupler assembly and with at least one of the wheels.

When the device is in use, a first end of a foot link travels in an arcuate path, while the second end travels in the reciprocating path; a user's foot which is supported on one of the foot links will travel in a generally elliptical path of travel; and, the power transfer linkage operates to transfer power between the coupler assembly and the wheel. In this manner, propulsive power can be provided by the user to the wheels so as to drive the exercise device. It is to be understood that while the invention is described herein as being used to power a bicycle-like device, the principles of the present invention may be likewise incorporated in other foot powered vehicles such as watercraft and the like.

Figure 1:
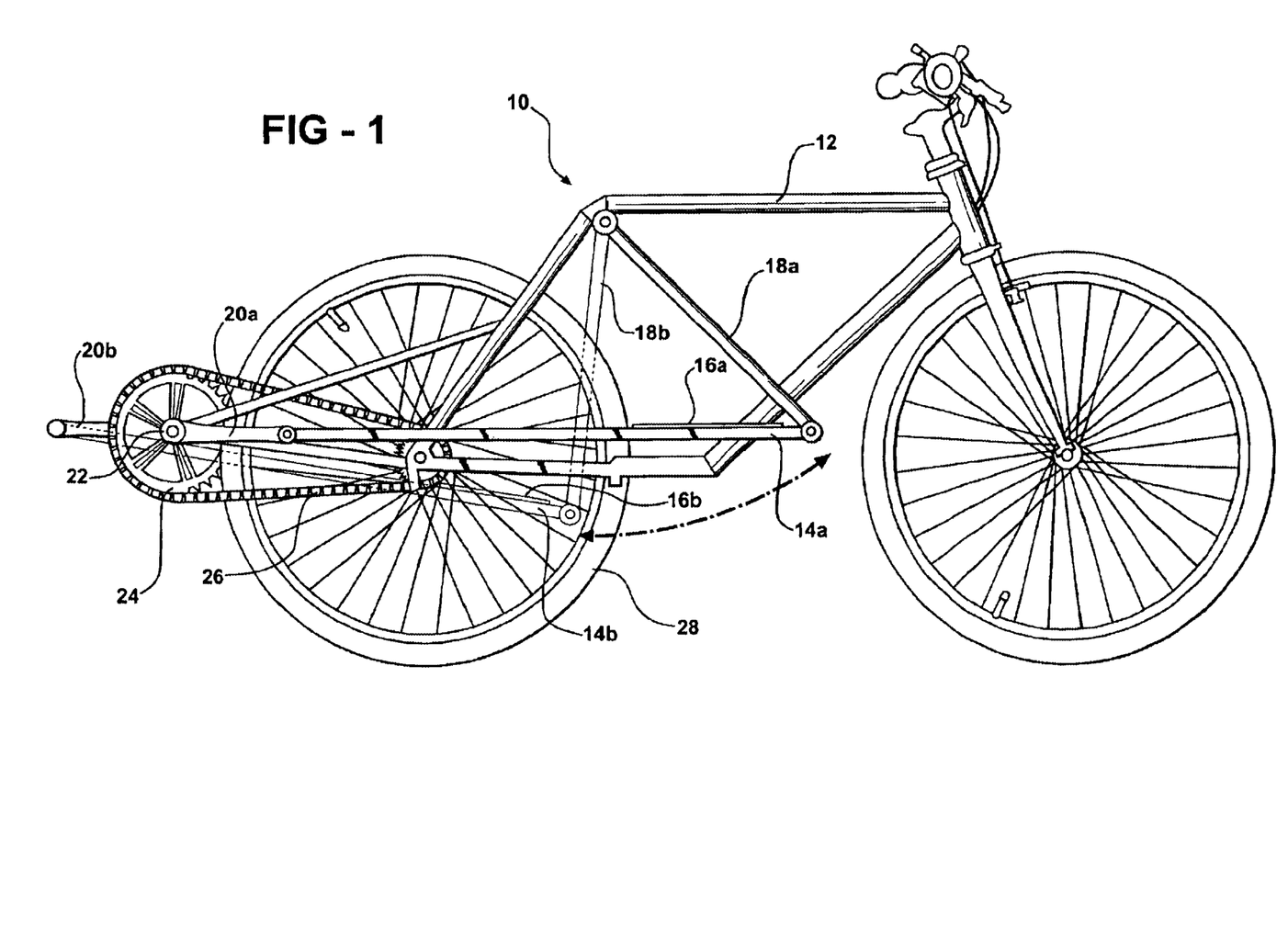
FIG. 1 is a right-side elevational view of one embodiment of the present invention.

Referring now to FIG. 1, there is shown a first embodiment of a bicycle configured in accord with the principles of the present invention. Bicycle 10 of FIG. 1 is built on a standard bicycle frame 12 as is known in the art. This embodiment includes a first 14a and a second 14b foot link, and each foot link includes a foot receiving portion comprising a foot pad 16 directly affixed thereto between the first and second ends of the foot link. The exercise device includes a foot link guide, which in this instance is comprised of a pair of swing arms 18a, 18b which are pivotally affixed to the frame. The swing arms 18a, 18b each engage a second end of a respective foot link 16, and as will be seen from the drawing, these swing arms 18 direct the second ends of the foot links 16 along a reciprocal path of travel as shown by the dashed arrow.

The device further includes a coupler assembly, which in this embodiment includes a pair of crank arms 20a, 20b which are pivotally supported on the frame at a first pivot axis 22. The crank arms 20 are coupled to first ends of their respective foot links 14, and they operate to direct those first ends in a generally arcuate path of travel, which in this instance comprises a circular path of travel which encompasses the first pivot axis 22. It is to be understood that depending on the configuration of the coupler assembly, this arcuate path need not be circular, and need not be centered on the pivot axis 22; and in some instances, it may not encompass the pivot axis at all. The combination of reciprocal and arcuate motion achieved by the foot links 14 will cause a user's foot, which is disposed upon the foot pad 16, to travel in a generally elliptical path of travel.

The FIG. 1 embodiment further includes a power transfer linkage which operates to transfer power between the foot link and a wheel. In this specific embodiment, the power transfer linkage includes a sprocket gear 24, which rotates about the first pivot axis 22 along with the crank arms 20. The sprocket gear in turn drives a drive chain 26 which in turn drives the rear wheel 28 of the device. As is known in the art, a transmission, such as a derailer assembly or an internal hub-based transmission, may be associated with the sprocket 24 and drive chain 26 so as to vary the amount of torque delivered to the wheel 28. As is further known in the art, the device may include hand brakes, a seat, and other conventional accessories. In some instances, the swing arms 18 may be configured so that their lengths and/or the pivot points at which they are joined to the frame 12, or foot links 14, may be made adjustable so as to vary the action of the device.

Figure 2:
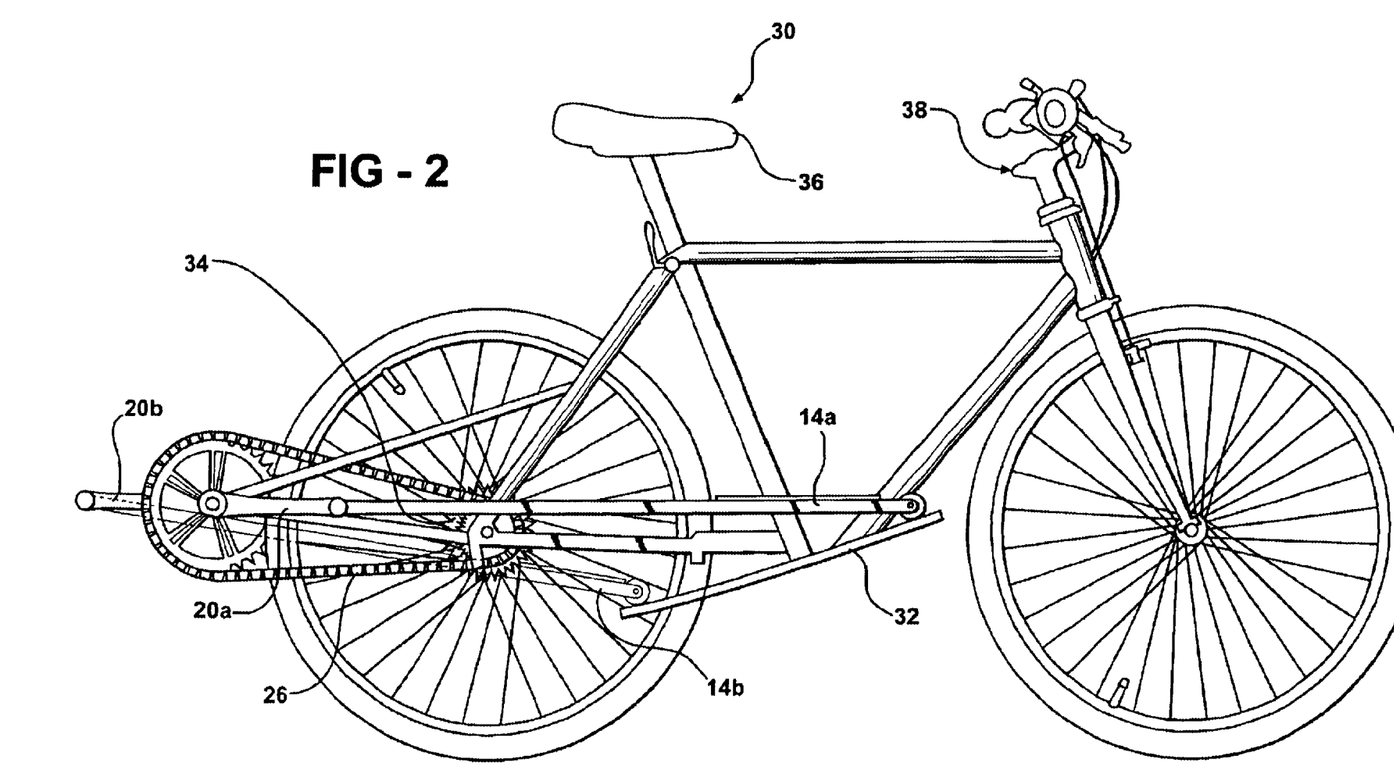
FIG. 2 is a right-side elevational view of another embodiment of the present invention.

Referring now to FIG. 2, there is shown yet another embodiment of exercise device 30 structured in accord with the principles of the present invention. In the FIG. 2 embodiment, the foot links 14a, 14b are as generally described with regard to FIG. 1, and the coupler assembly includes crank arms 20a, 20b, also as generally described, which engage the first ends of the foot links 14, and direct them in an arcuate path of travel. In the FIG. 2 embodiment, the guide is configured as a track 32. This track 32 engages the second ends of the foot links 14 by means of a roller, and directs those second ends in a reciprocal path of travel. The track 32 may be a single track member which engages both foot links, or it may be comprised of two separate track units, each of which engages one of the foot links 14. The track may be fixed, or it may be positionable relative to the frame so as to allow for variation in the action of the device. Such repositionability may be provided by a jack screw, a telescoping support strut, a slot, a pin and hole arrangement, or by any other such means known in the art.

The FIG. 2 embodiment further illustrates the inclusion of a multi-gear ratio derailer system 34, in combination with the drive chain 26. As further illustrated, the exercise device includes a seat 36 and adjustable handlebars 38 which can be elevated to suit users of different heights.

Figure 3A:
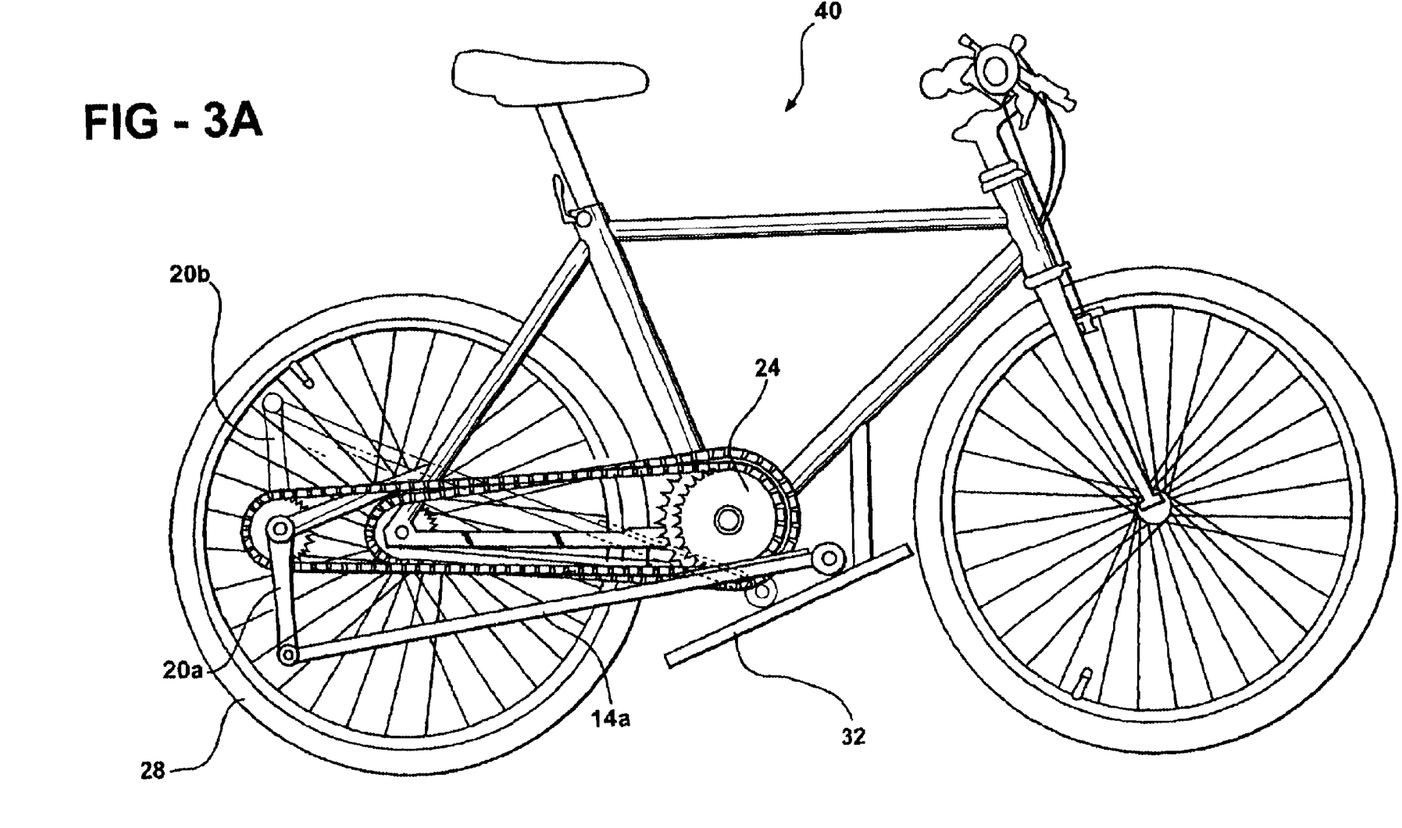
FIG. 3A is a right-side elevational view of a third embodiment of the present invention.
Figure 3B:
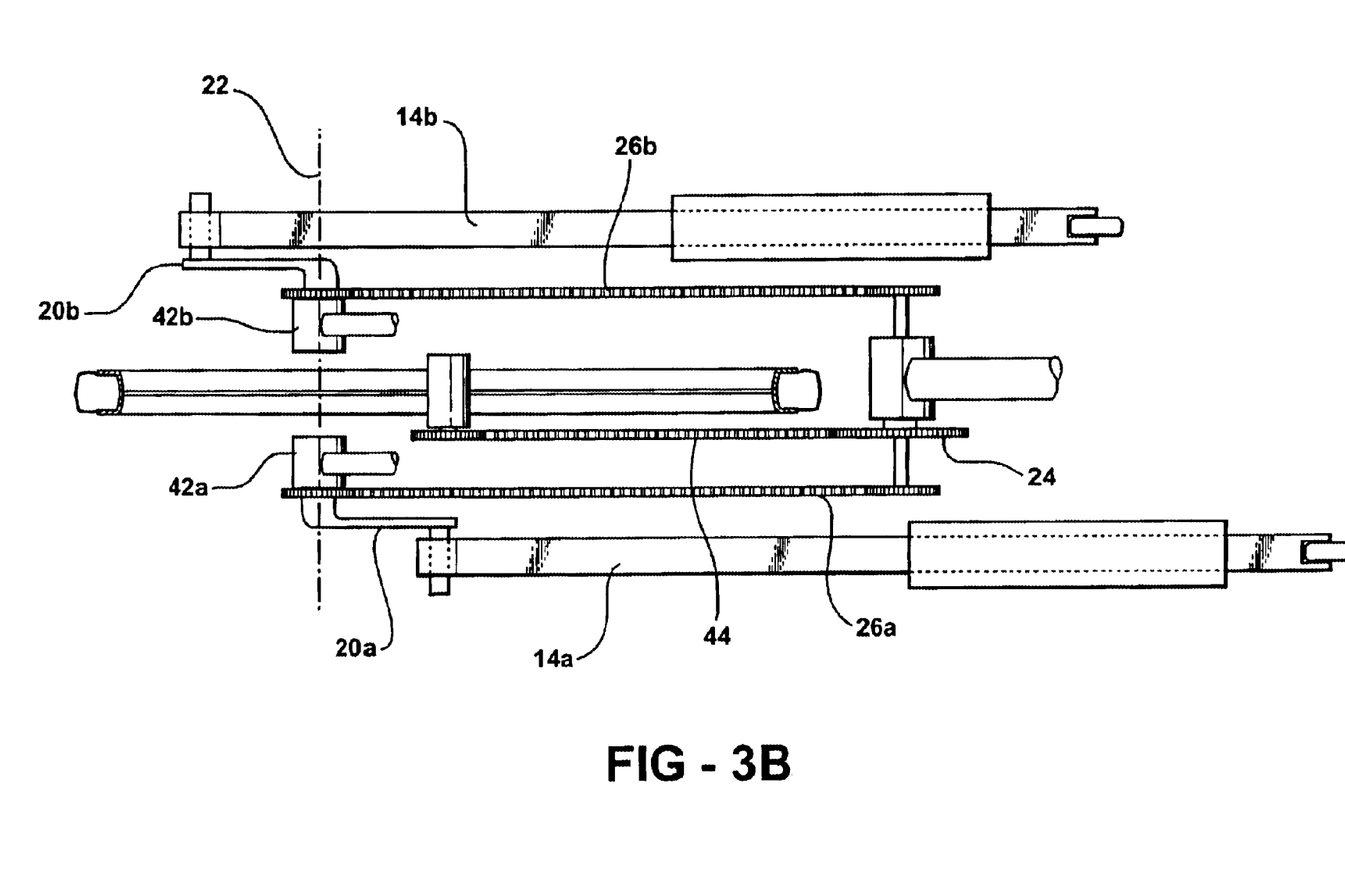
FIG. 3B is a top plan view of a portion of the mechanical linkages of the embodiment of FIG. 3A.

FIGS. 3A and 3B illustrate yet another embodiment of exercise device 40 structured in accord with the principles of the present invention. The device 40 of FIG. 3A includes foot links 14a, 14b which are generally similar to those previously described. The second ends of the foot links can, in this embodiment, be supported for reciprocal motion by a foot link guide which may comprise a track or a set of swing arms as previously disclosed, and FIG. 3A shows a track 32. As in the FIG. 2 embodiment, this track may be a single or dual unit track, and it may be adjustable.

The FIG. 3A embodiment includes a coupler assembly which is functionally similar to the coupler assemblies described with regard to FIG. 1 and FIG. 2; however, this particular coupler assembly is moved forward along the length of the bicycle, and hence includes a split axle. Referring now to FIG. 3B, there is shown a top plan view of the coupler assembly, power transfer linkage and foot links of the FIG. 3B embodiment. As illustrated therein, the coupler assembly includes a first 20a and a second 20b crank arm. These crank arms are supported for rotation about a first pivot axis 22 by a pair of split axles 42a, 42b which are supported by the frame of the bicycle. As in the previous embodiments, the crank arms engage the first ends of the foot links 14 and direct them along the arcuate path.

The FIGS. 3A and 3B embodiment differs from the FIG. 1 and 2 embodiments insofar as the power transfer linkage engages a drive sprocket 24 which is located between the two wheels of the bicycle, in accord with the positioning of a conventional bicycle drive train. This sprocket 24 engages and drives the rear wheel 28 by means of a conventional drive chain 44. In this embodiment, power is transferred from the crank arms 20 to the drive sprocket 24 by means of two separate chains 26a, 26b.

The FIGS. 3A and 3B embodiment has the advantage that the drive system may be readily incorporated into conventional bicycle design without significant change. The frame of the bicycle will have to be modified to accommodate the split axle crank arm design, and drive chains 26 will have to be included; however, the remainder of the drive and transmission system will be unchanged.

Figure 4:
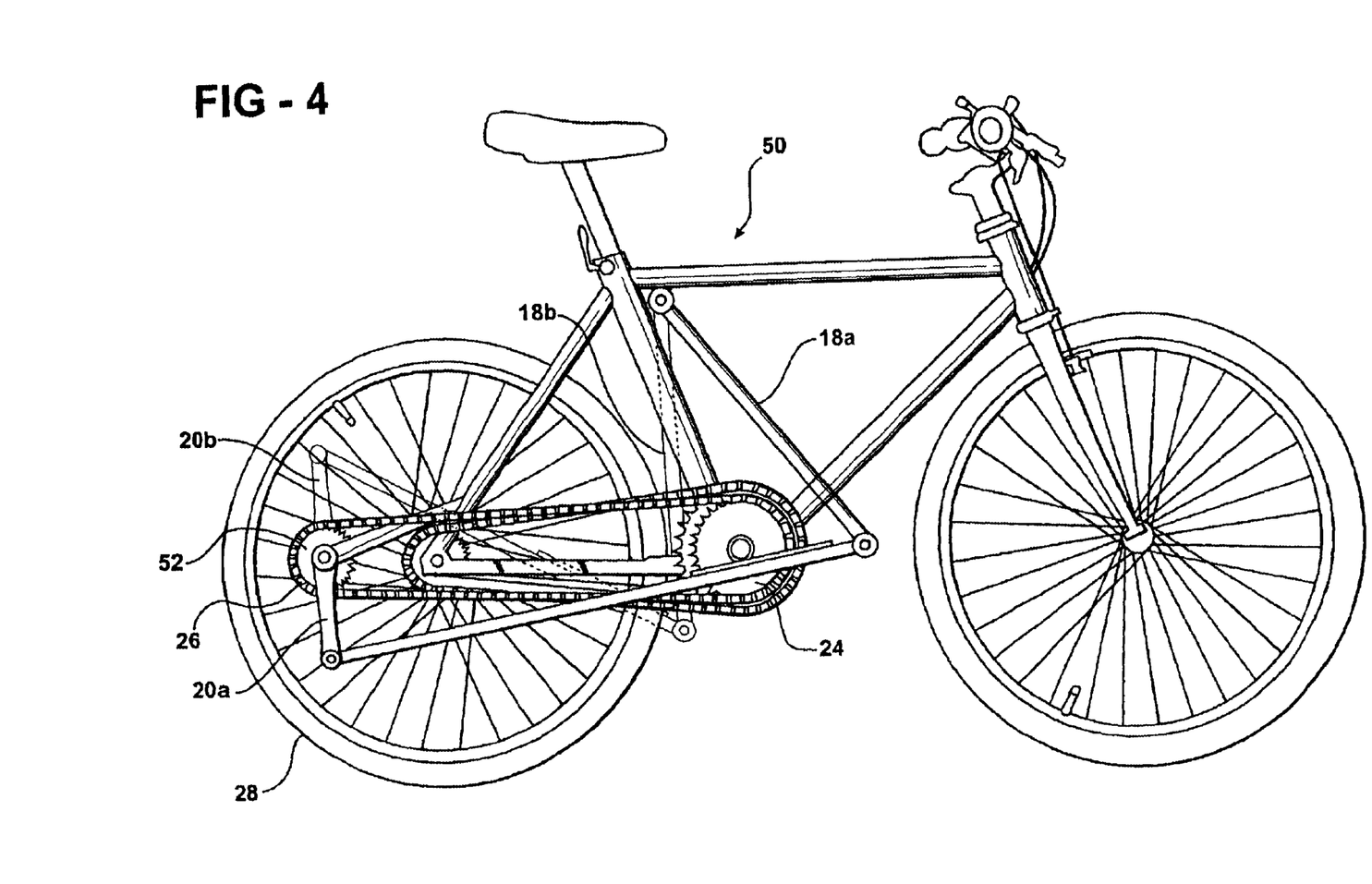
FIG. 4 is a right side elevational view of another embodiment of the present invention.

Referring now to FIG. 4, there is shown yet another embodiment of the present invention. The FIG. 4 embodiment also operates to drive the rear wheel 28 of the bicycle through a conventionally placed drive sprocket 24. The FIG. 4 embodiment 50 includes a coupler assembly having first and second crank arms 20a, 20b which are generally as described with reference to FIGS. 1 and 2 hereinabove. The FIG. 4 embodiment further includes a foot link guide which is comprised of first and second swing arms 18a, 18b, although it is to be understood that tracks or other members may be substituted therefor.

In the FIG. 4 embodiment, the drive sprocket 24 is powered, via a drive chain 26, which in turn is driven by a rear, crank sprocket 52. This embodiment achieves elliptical foot action, as previously described, and is also amenable to incorporation into conventional bicycle design.

Figure 5A:
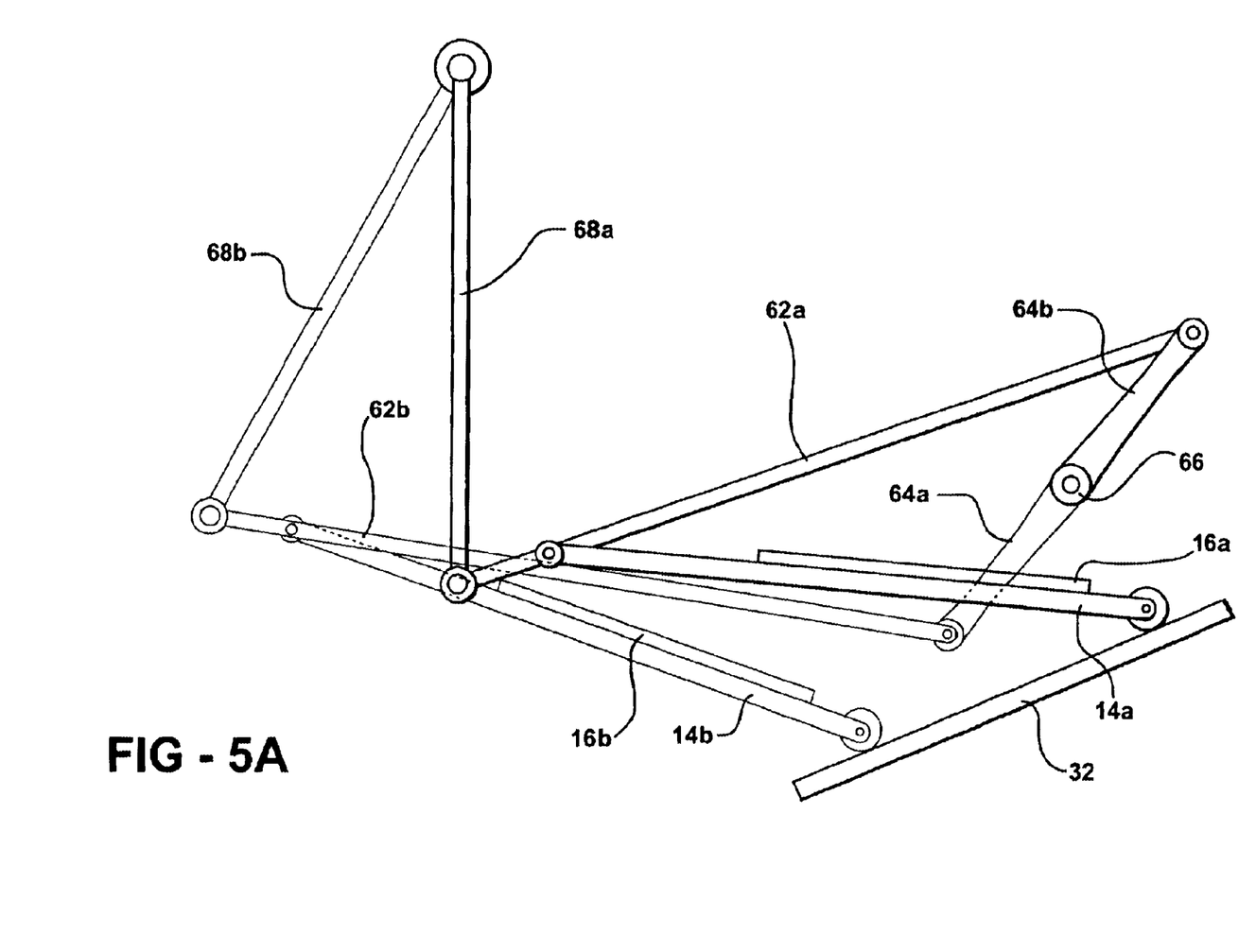
FIG. 5A is a side elevational view of a particular foot link, foot link guide, and coupler assembly of the present invention.
Figure 5B:
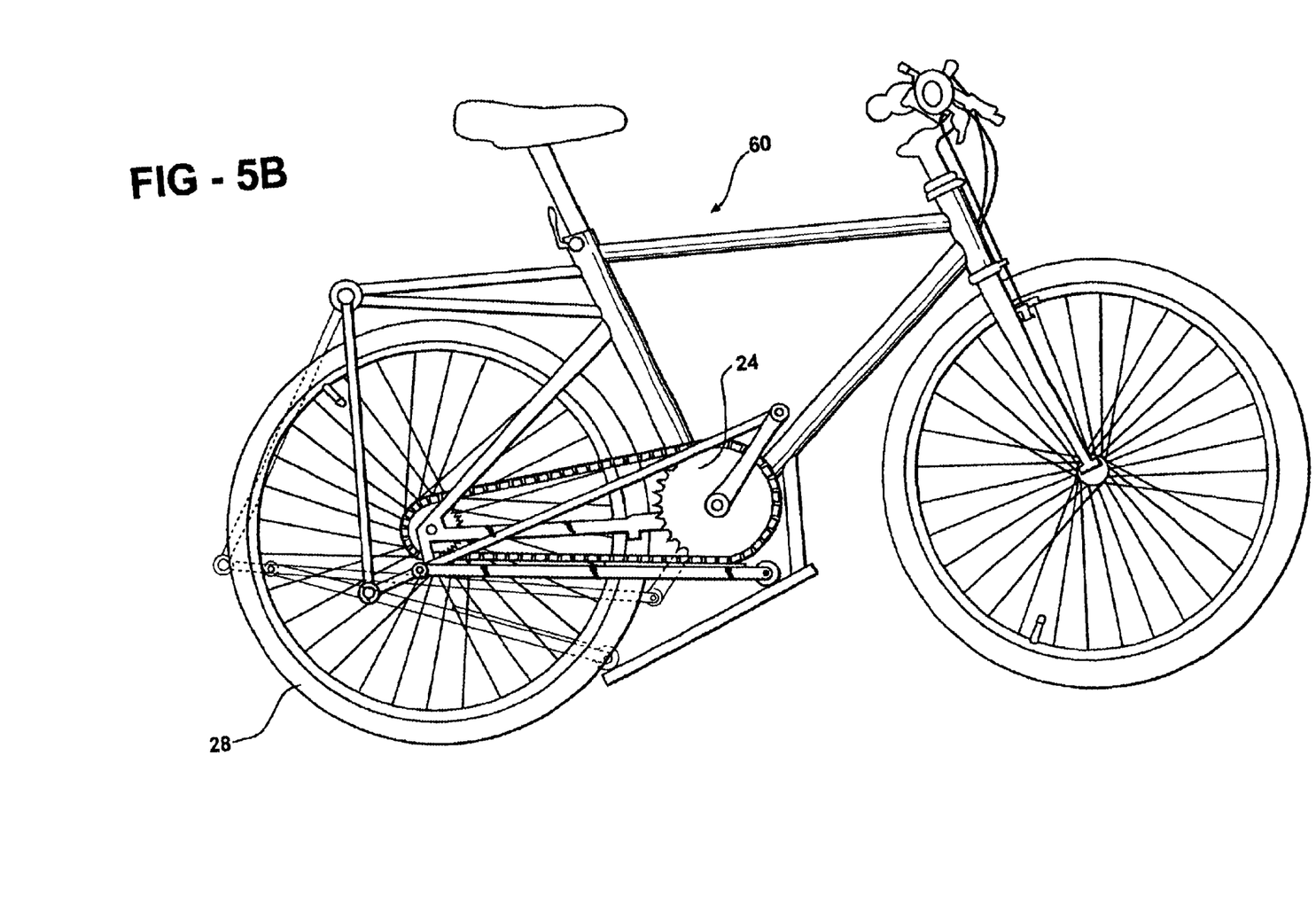
FIG. 5B is a side elevational view of an embodiment of the present invention incorporating the linkages of FIG. 5A therein.

While the embodiments heretofore described all show coupler assemblies based upon crank arms which operate to provide an arcuate path of travel to the first end of a foot link, the invention is not thus limited, and other mechanical arrangements for achieving the arcuate path may be employed. One such alternative configuration is shown in FIGS. 5A and 5B. Depicted therein is yet another embodiment of exercise bicycle 60. The linkage configuration of this embodiment will best be understood by reference to FIG. 5B, which shows an isolated side elevational view of the foot links, foot link guide, and coupler assembly of this embodiment. Specifically shown in FIG. 5B are first and second foot links 14a, 14b, and as in the previous embodiments, these foot links include a foot support portion 16a, 16b defined directly thereupon. As in the previous embodiments, second ends of the foot links is directed along a reciprocal path of travel by a foot link guide, which in this embodiment comprises a track assembly 32.

The coupler assembly of FIG. 5A includes a first and a second drive link 62a, 62b, each of which is pivotally connected to a first end of a respective foot link 14. As illustrated, a first end of each drive link 62 is pivotally coupled to a crank arm 64a, 64b, so as to be rotatable about a pivot axis 66. A second end of each of the drive links 62a, 62b is coupled to a drive link guide comprised of respective swing arm 68a, 68b which directs the second end of the drive links 62 along a reciprocal path of travel. In this embodiment, the first end of each foot link 14 is connected to a respective drive link 62 at a point on the drive link which is spaced from the first and second end thereof. In this embodiment, the coupler assembly, which is comprised of swing arms 68, drive links 62 and crank arms 64, operates to direct the first end of the foot links 14 in an arcuate path of travel. The track 32 directs the second ends of the foot links in a reciprocal path of travel; as a consequence, and as in the previous embodiments, the user's foot which is supported on a foot pad 16 will follow a generally elliptical path of travel as the device is in use.

In the FIG. 5B embodiment, the crank arms 64 are preferably associated with the front drive sprocket 24 of the bicycle, which then operates to drive the rear wheel 28, in accord with conventional design. As in previous embodiments, the track 32 may be replaced by swing arms; and the swing arms 68 may be replaced by one or more tracks.

Figure 6A:
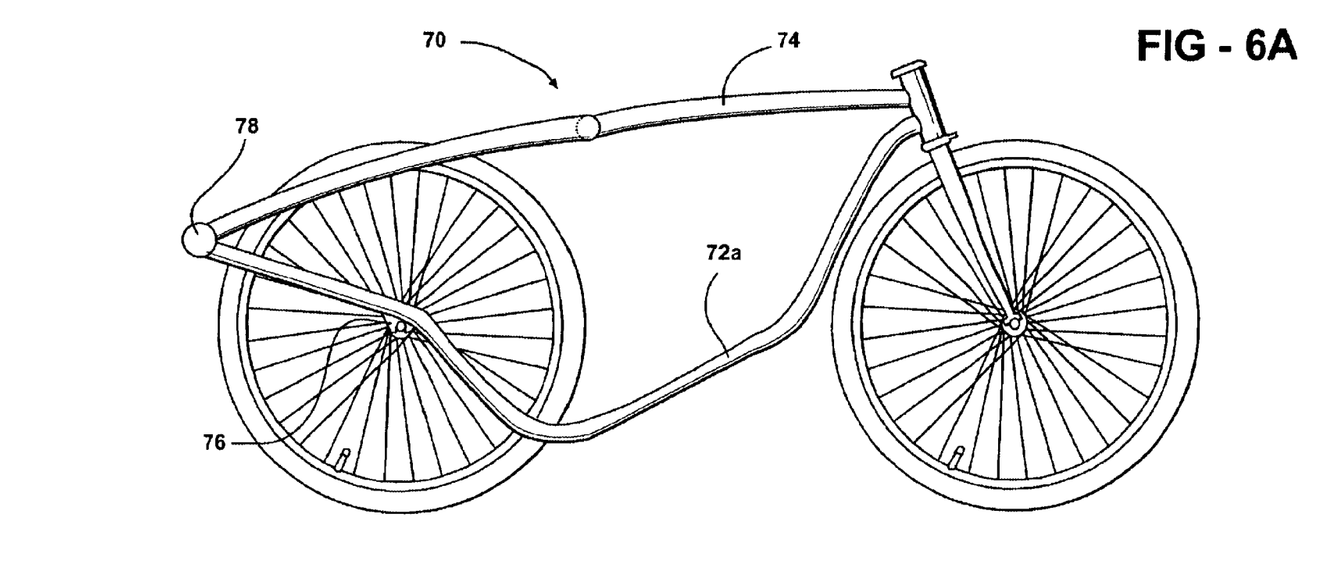
FIG. 6A is a side elevational view of a bicycle frame particularly adapted for use in the present invention.
Figure 6B:
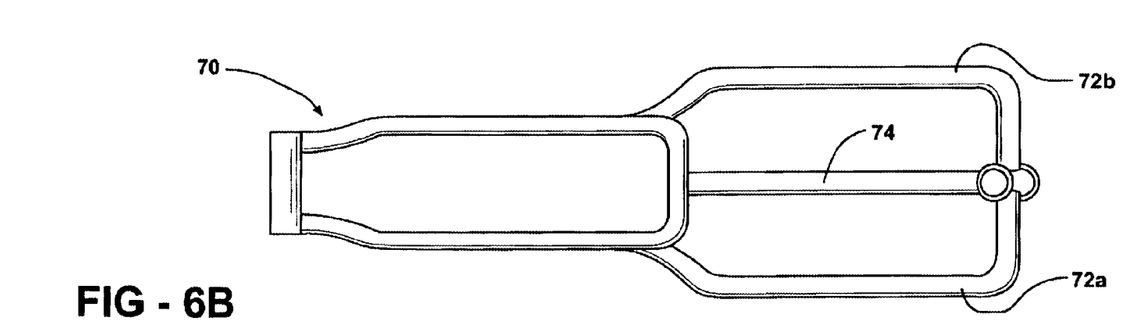
FIG. 6B is a top plan view of the bicycle frame of FIG. 6A.

The present invention may be implemented in yet other embodiments. Referring now to FIGS. 6A and 6B, there is shown a bicycle frame which is specifically adapted for use in the present invention. FIG. 6A depicts a side elevational view of the frame, and FIG. 6B depicts a top plan view of the frame. The frame 70 includes an integral set of tracks for directing the second ends of foot links in a reciprocating path of travel. Within the context of this disclosure the term "integral" refers to the fact that the tracks form a unitary, structural portion of the frame, also such are affixed to the remaining of the frame body by welds, brazing, rivets or bolts. This frame may be used with particular advantage in connection with embodiments of the present invention such as that shown in FIG. 2; although, it may also be used with other embodiments including those depicted herein as well as yet other embodiments not depicted herein. Use of the frame of FIGS. 6A and 6B will decrease the overall weights of an exercise device in which it is incorporated, and this is a significant advantage for a bicycle-type device. Also, the frame will decrease the mechanical complexity of the exercise device.

The frame 70 includes an integral set of track portions 72a, 72b. These tracks form the foot link guide, and engage the second ends of the foot links as described hereinabove. The tracks may be configured as tubular members having a circular cross-section, in which instance the second ends of the foot links may have correspondingly shaped rollers. Alternatively, the tracks may be flattened, or they may include concave guide portions. In yet other embodiments, the tracks 72a, 72b may support a contact surface such as a plate or rail on which the second ends of the foot links move. In such embodiments, adjustment means may be provided for varying the angular relationship between the contact surface and supporting rail. As further illustrated in FIGS. 6A and 6B, the frame includes a crossbar 74 and a rear axle support 76. In this embodiment, the frame also includes a pivot axis 78 defined to the rear thereof. This pivot axis will support the crank arms and other components of the coupler assembly as shown in FIG. 2. The frame will also include a fork assembly 7b pivotally supported by the body of the frame. As is known in the art, the fork assembly supports a wheel of the bicycle, and allows its axis of rotation to be displaced relative to the axis of rotation of the other wheel of the bicycle.

In those instances where other embodiments of bicycle are implemented in accord with the present invention, the frame may be adjusted accordingly. For example, in those embodiments which employ a split axle coupler assembly such as is shown in FIG. 3A, the frame 70 may be readily configured to accommodate the split axle. It will be appreciated that by the use of a dedicated frame such as is shown in FIGS. 6A and 6B, the mechanical complexity and weight of a bicycle of the present invention may be reduced. Also, the frame may be configured for use in tricycles or other wheeled vehicles.

Yet other embodiments of the present invention will be apparent to one of skill in the art in view of the teaching presented herein. For example, various other linkages may be implemented to provide the coupler assembly and/or guide functions. Likewise, the drive linkage may be variously configured. Furthermore, it is to be understood that while the present invention has been described with regard to an upright bicycle, the principles of the present invention may be incorporated into other self-powered devices such as recumbent bicycles, tricycles and the like. Also, the principles of the present invention may be readily extended to other pedal powered devices such as watercraft and aircraft.

The various linkages and assemblies shown herein may also be implemented in connection with stationary exercise equipment by elimination of the drive linkage. All such embodiments are within the scope of the present invention. It is the following claims, including all equivalents, which define the scope of the invention.

What is claimed is:

1. A self-propelled exercise device comprising:
    a frame having a drive wheel rotatably supported thereupon, and a first pivot axis defined thereupon;
    a first and a second foot link, each having a foot receiving portion defined thereupon;
    a coupler assembly which is in mechanical communication with said first pivot axis, and with a first end of each of said first and second foot links, said coupler assembly being operative to direct said first ends of said foot links in an arcuate path of travel;
    a foot link guide supported by said frame, said guide being operable to engage a second end of each of said foot links, and to direct said second ends along a reciprocating path of travel;
    a power transfer linkage in mechanical communication with said coupler assembly, and with said drive wheel; whereby when the first end of one of said foot links travels in said reciprocal path and the second end of that foot link travels in said arcuate path, a user's foot supported thereupon travels in a generally elliptical path of travel, and said power transfer linkage transfers power from said coupler assembly to said drive wheel so as to supply propulsive power thereto.

2. The exercise device of claim 1, wherein said foot link guide includes at least one track which engages said second end of said foot links.

3. The exercise device of claim 2, wherein the angular relationship of said at least one track to the frame may be varied.

4. The exercise device of claim 1, wherein said foot link guide includes a first and a second swing arm which are pivotally supported upon said frame at a second pivot axis defined thereupon, wherein each of said swing arms engages said second end of a respective foot link and directs said second end along said reciprocating path of travel.

5. The exercise device of claim 1, wherein said coupler assembly includes a first and a second crank arm which are pivotally supported at said first pivot axis.

6. The exercise device of claim 1, wherein said power transfer linkage includes a drive chain or a drive belt.

7. The exercise device of claim 1, wherein said power transfer linkage includes a transmission which is operable to selectably provide differing levels of output torque from a given power input.

8. The exercise device of claim 1, wherein the foot receiving portion of each of said foot links is disposed between the first and second end of each foot link.

9. The exercise device of claim 1, wherein said coupler assembly includes:
    a first and a second drive link, each drive link having a first and a second end;
    a first and a second coupling member, each coupling member being in mechanical communication with a first end of a respective one of said drive links, and with said first pivot axis, each coupling member being operative to direct said first end of its respective drive link in an arcuate path of travel; and
    a drive link guide which is operable to engage a second end of a respective one of said drive links and to direct said second ends along a reciprocal path of travel;
    wherein said first ends of said foot links each engage a respective one of said first and second drive links;
    whereby said drive links direct said first ends of said foot links in said arcuate path of travel.

10. The exercise device of claim 9, wherein said first and second coupling members each comprise a crank arm.

11. The exercise device of claim 9, wherein said drive link guide includes at least one track which engages said second ends of said drive links.

12. The exercise device of claim 9, wherein said drive link guide includes a first and a second swing arm which are pivotally supported on said frame at a third pivot axis defined thereupon, wherein each of said swing arms engages said second end of a respective drive link and directs said second end along said reciprocating path of travel.

13. The exercise device of claim 1, wherein when a user's foot is disposed upon one of said foot links, and when said second end of said foot link travels from a point at a rearward end of said reciprocating path forward along said path, the heel portion of said user's foot initially rises at a faster rate than the toe portion thereof, and when said second end of said foot link travels rearward along said reciprocating path of travel from a forward end thereof, the heel portion of the user's foot initially lowers at a faster rate than the toe portion.

14. The exercise device of claim 1, wherein said frame is a bicycle frame, and wherein said foot link guide comprises a track which is defined by an integral portion of said frame.

15. The exercise device of claim 14, wherein said track comprises a first, generally tubular member which engages the second end of said first foot link, and a second generally tubular member which engages the second end of said second foot link.

* * * * *

UNITED STATES PATENT AND TRADEMARK OFFICE
CERTIFICATE OF CORRECTION

| | |
|---|---|
| PATENT NO. | : 6,663,127 B2 |
| APPLICATION NO. | : 10/241393 |
| DATED | : December 16, 2003 |
| INVENTOR(S) | : Larry D. Miller |

It is certified that error appears in the above-identified patent and that said Letters Patent is hereby corrected as shown below:

Column 7, line 32, replace "first" with --second--

Column 7, line 33, replace "second" with --first--

Signed and Sealed this

Fourth Day of November, 2008

JON W. DUDAS
*Director of the United States Patent and Trademark Office*